(12) United States Patent
Zhu et al.

(10) Patent No.: US 11,139,557 B2
(45) Date of Patent: Oct. 5, 2021

(54) ANTENNA ASSEMBLY FOR TERMINAL WITH FOLDABLE SCREEN AND TERMINAL

(71) Applicant: AAC Technologies Pte. Ltd., Singapore (SG)

(72) Inventors: Yufei Zhu, Shenzhen (CN); Kai Dong, Shenzhen (CN); Shengjun Liu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/994,645

(22) Filed: Aug. 16, 2020

(65) Prior Publication Data

US 2020/0411957 A1 Dec. 31, 2020

Related U.S. Application Data

(63) Continuation of application No. PCT/CN2019/094096, filed on Jun. 30, 2019.

(51) Int. Cl.
*H01Q 1/24* (2006.01)
*H01Q 5/307* (2015.01)
*H04B 7/0413* (2017.01)
*H04M 1/02* (2006.01)

(52) U.S. Cl.
CPC ............ *H01Q 1/243* (2013.01); *H01Q 5/307* (2015.01); *H04B 7/0413* (2013.01); *H04M 1/0268* (2013.01)

(58) Field of Classification Search
CPC ....................................................... H01Q 1/243
See application file for complete search history.

(56) References Cited

U.S. PATENT DOCUMENTS

| 10,353,426 B2 * | 7/2019 | Pantel | H04M 1/0264 |
| 2019/0189042 A1 * | 6/2019 | Aurongzeb | G06F 1/1637 |
| 2019/0305403 A1 * | 10/2019 | Wang | H01Q 1/244 |
| 2019/0342542 A1 * | 11/2019 | Bai | H04N 7/147 |
| 2019/0350465 A1 * | 11/2019 | Sahin | A61B 5/1102 |

* cited by examiner

*Primary Examiner* — Hsinchun Liao
(74) *Attorney, Agent, or Firm* — W&G Law Group

(57) ABSTRACT

A terminal with a foldable screen and an antenna assembly thereof are disclosed. The antenna assembly includes a foldable frame and seven antenna modules. The frame includes a first side frame; a second side frame opposite to the first side frame, a third side frame, and a fourth side frame. A first antenna portion is disposed at a corner connecting the first side frame to the third side frame. A second antenna portion is disposed at a corner connecting the second side frame and the third side frame. A third antenna portion is disposed on the second sub-frame. Fourth, fifth, and sixth antenna portions are sequentially arranged on the fourth side frame. A seventh antenna portion is disposed on the fourth sub-frame. At least 2*2 MIMO configuration of WIFI frequency band and 4*4 MIMO configuration of 5G NR frequency band below Sub-6G frequency band are formed by the antenna modules.

20 Claims, 12 Drawing Sheets

ANTENNA ASSEMBLY FOR TERMINAL WITH FOLDABLE SCREEN AND TERMINAL

TECHNICAL FIELD

The described embodiments relates to the field of communication, and more specifically, to an antenna assembly and a terminal for a terminal having a foldable screen.

BACKGROUND

With the development of communication technology and the continuous update of 4G, 5G and 6G technologies, more and more antennas are installed in terminals such as smart phones. Nowadays, users pursue a greater screen-to-body ratio for terminals, which provides higher requirements for the design of antennas. In the related technical solutions, a variety of antenna design solutions related to the 4G technology are given. However, these antenna designs are only applicable to common terminals having non-foldable screens or non-flexible screen. For terminals with foldable screens, no antenna solutions applicable to the terminals with foldable screens are disclosed in the relevant technology. Besides, there is no further antenna solution that can meet the antenna performance requirements of Sub-6G frequency band.

Therefore, it is necessary to provide an antenna design solution that meets the antenna performance requirements of Sub-6G frequency band and that is applicable to the terminals with foldable screens.

SUMMARY

In some aspects of the present disclosure, an antenna assembly for a terminal with a foldable screen may be disclosed. The antenna assembly may include a foldable frame and seven antenna modules arranged on the frame. The frame comprises a first frame body and a second frame body rotatably connected to the first frame body, such that the first frame body is foldable to the second frame body; when the first frame body is folded to the second frame body, the first frame body is overlapped with the second frame body. The frame comprises: a first side frame, wherein the first side frame comprises a first sub-frame and a second sub-frame that are disposed symmetrically about a folding line of the frame; a second side frame, opposite to the first side frame, wherein the second side frame comprises a third sub-frame and a fourth sub-frame that are arranged symmetrically about the folding line of the frame; the first sub-frame is disposed oppositely to the third sub-frame, and the second sub-frame is disposed oppositely to the fourth sub-frame; a third side frame, connected between the first side frame and the second side frame; and a fourth side frame, opposite to the third side frame and connected between the first side frame and the second side frame. The first frame body comprises the first sub-frame, the third side frame, and the third sub-frame, and the second frame body comprises the second sub-frame, the fourth sub-frame, and the fourth side frame. A first antenna portion, a second antenna portion, a third antenna portion, a fourth antenna portion, a fifth antenna portion, a sixth antenna portion, and a seventh antenna portion are disposed on the frame, and the seven antenna modules correspond to the first antenna portion, the second antenna portion, the third antenna portion, the fourth antenna portion, the fifth antenna portion, the sixth antenna portion, and the seventh antenna portion in a one-to-one correspondence; the first antenna portion is disposed at a corner connecting the first side frame to the third side frame; the second antenna portion is disposed at a corner connecting the second side frame and the third side frame; the third antenna portion is disposed on the second sub-frame; the fourth antenna portion, the fifth antenna portion, and the sixth antenna portion are sequentially arranged on the fourth side frame and spaced apart from each other; the fourth antenna portion is disposed close to the first side frame; the sixth antenna portion is disposed close to the second side frame, and the seventh antenna portion is disposed on the fourth sub-frame. The seven antenna modules cooperate with each other to form at least 2*2 MIMO (Multiple Input Multiple Output) configuration of a WIFI (Wireless Fidelity) frequency band and 4*4 MIMO configuration of a 5G NR (new ratio) frequency band below a Sub-6G frequency band.

In some embodiments, a plurality of transmission portions are arranged on the frame, and radio frequency signals are capable of being transmitted through the plurality of transmission portions.

In some embodiments, the plurality of transmission portions comprises the transmission portions disposed at two opposite ends of each of the first antenna portion, the second antenna portion, the third antenna portion, the fourth antenna portion, the fifth antenna portion, the sixth antenna portion, and the seventh antenna portion.

In some embodiments, the plurality of transmission portions are openings defined in at least one non-metal side frame of the frame.

In some embodiments, a size of the first side frame in a first direction is substantially 1.35 mm, a size of the second side frame in the first direction is substantially 1 mm, a size of the third side frame in a second direction is substantially 0.5 mm, and a size of the fourth side frame in a second direction is substantially 0.5 mm. The first direction is a direction directed from the first side frame to the second side frame, and the second direction is a direction directed from the third side frame to the fourth side frame; the first direction is substantially vertical to the second direction.

In some embodiments, the first antenna portion is operated in a GNSS (Global Navigation Satellite System) frequency band and the WIFI frequency band; the second antenna portion is operated in the WIFI frequency band; the third antenna portion is operated in a 4G frequency band and the 5G NR frequency band; the fourth antenna portion is operated in the 5G NR frequency band; the fifth antenna portion is operated in the 5G NR frequency band; the sixth antenna portion is operated in the 5G NR frequency band; and the seventh antenna portion is operated in the 4G frequency band and 5G NR frequency band.

In some embodiments, frequency bands of the antenna module corresponding to the first antenna portion are 1550-1620 MHz, 2.4-2.5 GMHz, and 5.15-5.85 GMHz; frequency bands of the antenna assembly corresponding to the second antenna portion are 2.4-2.5 GMHz and 5.15-5.85 GMHz; frequency bands of the antenna assembly corresponding to the third antenna portion are 790-960 MHz, 1710-2690 MHz, 2496-2690 MHz, 3400-3600 MHz, and 4800-5000 MHz; frequency bands of the antenna assembly corresponding to the fourth antenna portion are 2496-2690 MHz, 3400-3600 MHz, and 4800-5000 MHz; a frequency band of the antenna assembly corresponding to the fifth antenna portion is 3400-3600 MHz; frequency bands of the antenna assembly corresponding to the sixth antenna portion are 2496-2690 MHz, 3400-3600 MHz, and 4800-5000 MHz;

frequency bands of the antenna assembly corresponding to the seventh antenna portion are 790-960 MHz, 1710-2690 MHz, and 4800-5000 MHz.

In some embodiments, the third antenna portion and the seventh antenna portion are configured to realize mobile communications under 2G, 3G, and 4G frequency bands; the first antenna portion and the second antenna portion are configured to realize the 2*2MIMO configuration under the WIFI frequency band; the third antenna portion, the fourth antenna portion, the fifth antenna portion, the sixth antenna portion, and the seventh antenna portion are further configured to realize the 4*4 MIMO configuration under the Sub-6G frequency band, and the first antenna portion is configured to realize a GNSS navigation and positioning communication.

In some embodiments, the first side frame, the third side frame, the second side frame, and the fourth side frame are connected end-to-end. And the frame is substantially in shape of a square.

In some aspect, a terminal may be further disclosure. The terminal may include the antenna assembly as previously described; and a foldable screen, switchable between an unfolded state and a folded state and comprising a first display screen and a second display screen, wherein the first display screen is disposed on the first frame body, and the second display screen is disposed on the second frame body; when the foldable screen is in the unfolded state, the first display screen and the second display screen cooperatively form a display region of the terminal; when the foldable screen is in the folded state, the second display screen forms the display region of the terminal.

In some embodiments, the terminal further comprises a USB (Universal Serial Bus) module, and the USB module is arranged adjacently to the third sub-frame.

In some embodiments, the terminal further comprises a speaker, and the speaker is arranged adjacently to the third sub-frame and further opposite to the transmission portion which is arranged on the third sub-frame and which is adjacent to the second antenna portion.

In some embodiments, the speaker is configured to transmit sound signals via the transmission portion which is arranged on the third sub-frame and which is adjacent to the second antenna portion.

DETAILED DESCRIPTION

The present disclosure will be further described below with reference to the drawings and embodiments.

In some embodiments of the present disclosure, an antenna assembly for a terminal with a foldable screen may be disclosed.

Figure 1:
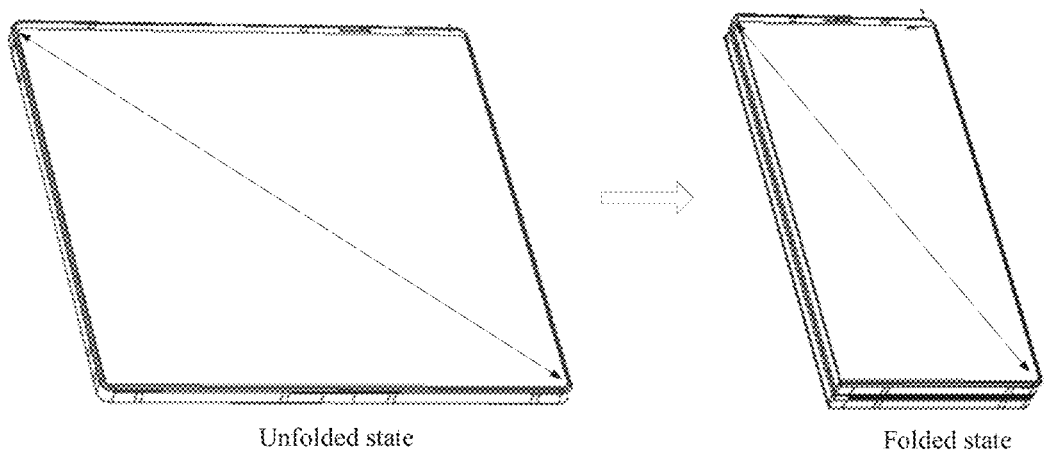
FIG. 1 is a schematic view of a terminal with a foldable screen according to some embodiments of the present disclosure.

As shown in FIG. 1, an example of the terminal with a foldable screen may be given. FIG. 1 is a schematic view of the terminal. On the left view of FIG. 1, the foldable screen is in an unfolded state. On the right view of FIG. 1, the foldable screen is in a folded state. As shown in FIG. 1, the foldable screen may be a foldable screen which is foldable along a left and right direction. The terminal may be a smart phone or other portable mobile terminals.

Figure 2:
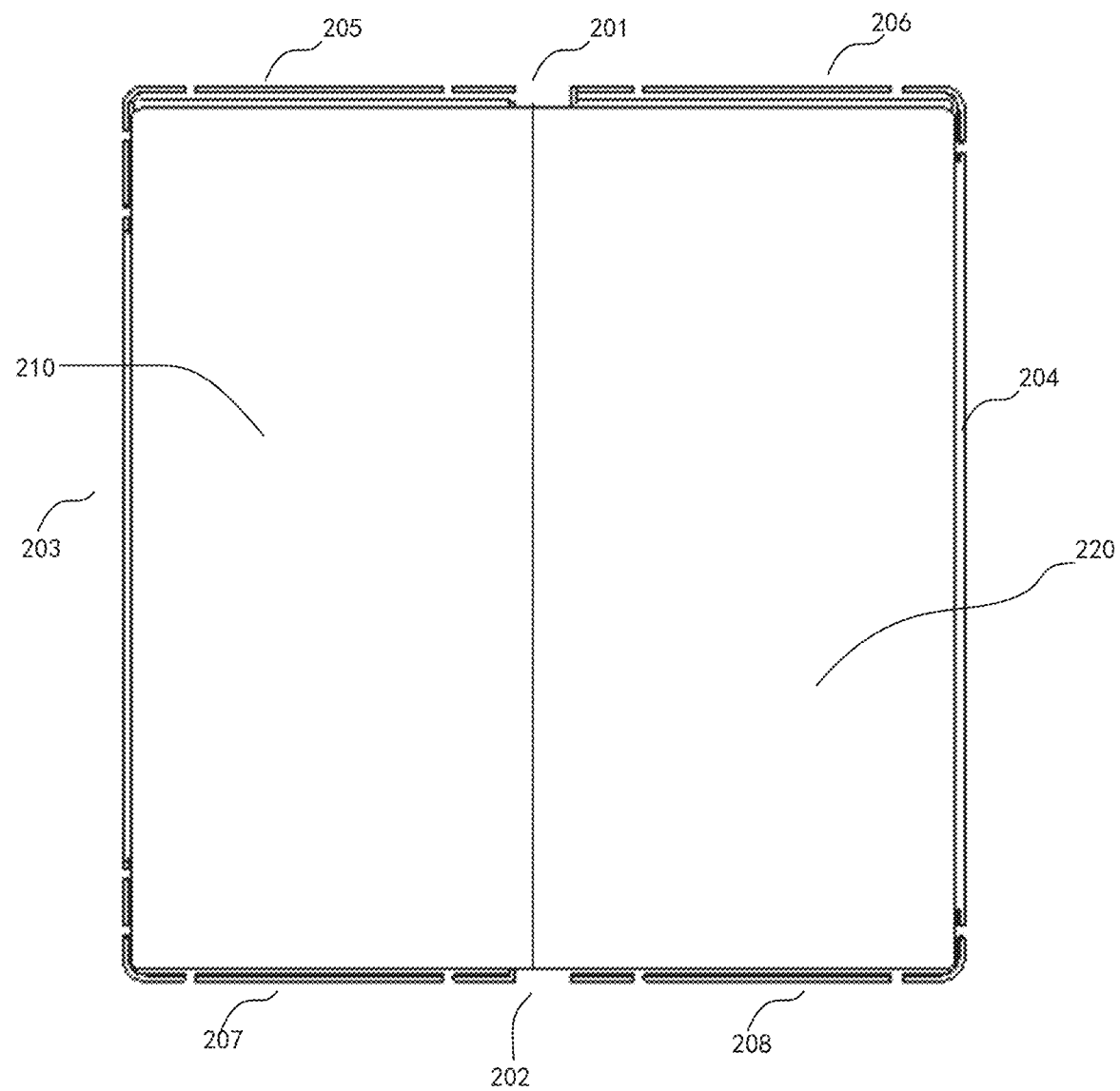
FIG. 2 is a schematic view of a frame according to some embodiments of the present disclosure.
Figure 3:
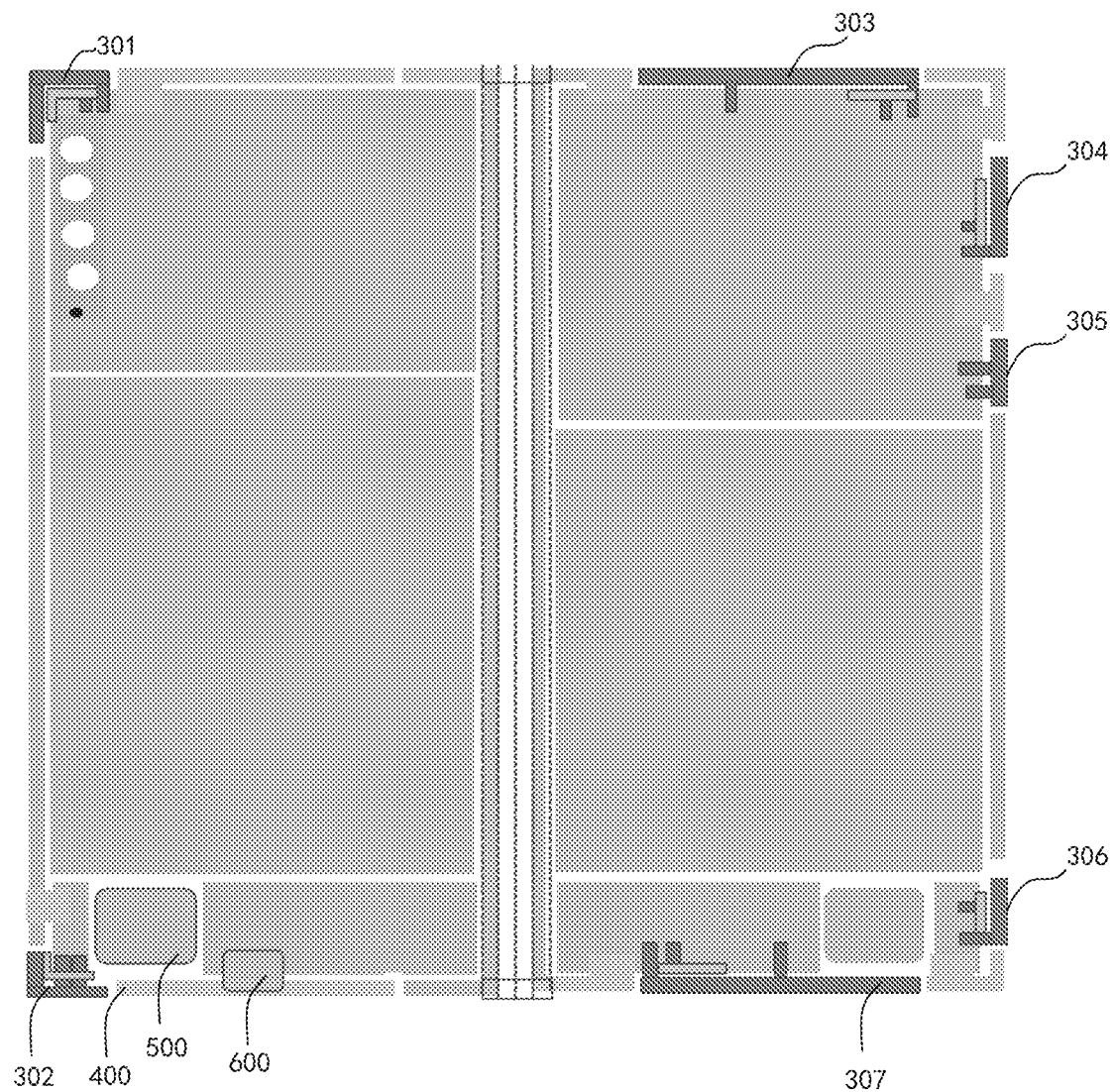
FIG. 3 is a schematic view of a configuration layout of an antenna assembly on the frame of the terminal with the foldable screen according to some embodiments of the present disclosure.

As shown in FIG. 2 and FIG. 3, an antenna assembly 100 used for the terminal having the foldable screen may be disclosed. The antenna assembly 100 may include a foldable frame 200 and seven antenna modules disposed on the frame 200.

More specifically, the frame 200 may include a first frame body 210 and a second frame body 220 rotatably connected to the first frame body 210. The first frame body 210 may be rotatably connected to the second frame body 220, such that the frame 200 may be foldable, and thus it is possible to cooperate with the folding of the foldable screen of the terminal. As shown in FIG. 1, when the first frame body 210 is folded to the second frame body 220, the first frame body 210 may be overlapped with the second frame body 220. Since the screen of the terminal is a foldable along the left and right direction, the frame 200 may also be divided into two parts (a left part and a second part). As shown in FIG. 2, the left part may correspond to the first frame body 210, and the right part may correspond to the second frame body 220.

Furthermore, as shown in FIGS. 2 and 3, the frame 200 may include a first side frame 201, a second side frame 202 opposite to the first side frame 201, a third side frame 203, and a fourth side frame 204 opposite to the third side frame 203. In some embodiments, the first side frame 201 may be a top frame of the terminal, the second side frame 202 may be a bottom frame of the terminal, and the third side frame 203 and the fourth side frame 204 may be side frames (left and right frames shown in FIG. 2) of the terminal. The third side frame 203 and the fourth side frame 204 may be connected between the first side frame 201 and the second side frame 202. The first side frame 201, the second side frame 202, the third side frame 203, and the fourth side frame 204 may be connected end-to-end around a periphery the terminal to cooperatively form or define the frame 200 disposed along the periphery the terminal. In some embodiments, as shown in FIGS. 2-3, the frame 200 may be substantially in shape of a square. The first side frame 201 may be substantially perpendicular to the third side frame 203.

The first side frame 201 may include a first sub-frame 205 and a second sub-frame 206 which are disposed symmetrically about a foldable line of the frame 200 and which are spaced apart from each other with a gap therebetween. The second side frame 202 may also include a third sub-frame 207 and a fourth sub-frame 208 which are disposed symmetrically about a foldable line of the frame 200 and which are spaced apart from each other with a gap therebetween. The first sub-frame 205 may be disposed oppositely to the third sub-frame 207, and the second sub-frame 206 may be disposed oppositely to the fourth sub-frame 208. In some embodiments, the first frame body 210 may include three side frames including the first sub-frame 205, the third side frame 203, and the third sub-frame 207. That is to say, the first sub-frame 205, the third side frame 203, and the third sub-frame 207 cooperatively form the first frame body 210. The second frame body 220 may include three side frames including the second sub-frame 206, the fourth sub-frame 208, and the fourth side frame 204. That is to say, the second sub-frame 206, the fourth sub-frame 208, and the fourth side frame 204 cooperatively form the second frame body 220.

It should be noted that, the seven antenna modules are disposed in the frame 200. Therefore, clearance regions for the seven antenna modules may also be defined in the frame 200. In some embodiments, in order to realize the arrangements of the seven antenna modules used for the Sub-6G frequency band, it may have specific size requirements for the corresponding clearance regions. More specifically, as shown in FIG. 2, a size of the first side frame 201 in a first direction may be substantially 1.35 mm, a size of the second side frame 202 in the first direction may be substantially 1 mm, and sizes of the third side frame 203 and the fourth side frame 204 in a second direction may be substantially 0.5 mm, respectively. In some embodiments, the first direction may be a direction directed from the first side frame 201 to the second side frame 202. The second direction may be a direction directed from the third side frame 203 to the fourth side frame 204. The first direction may be substantially vertical to the second direction. In some embodiments, the first side frame 201 may be substantially vertical to the third side frame 203, and thus the first direction may also be called as the extension direction of the third side frame 203, and the second direction may also be called as the extension direction of the first side frame 201.

As shown in FIG. 3, a first antenna portion 301, a second antenna portion 302, a third antenna portion 303, a fourth antenna portion 304, a fifth antenna portion 305, a sixth antenna portion 306, a seventh antenna portion 307 corresponding to the seven antenna modules may be disposed on the frame 200, respectively. In some embodiments, the first antenna portion 301 may be disposed at a corner connecting the first side frame 201 (and specifically the first sub-frame 205) to the third side frame 203. The second antenna portion 302 may be disposed at a corner connecting the second side frame 202 (and specifically the third sub-frame 207) and the third side frame 203. The third antenna portion 303 may be disposed on the second sub-frame 206. The fourth antenna portion 304, the fifth antenna portion 305, and the sixth antenna portion 306 may be sequentially arranged on the fourth side frame 204, and may spaced apart from each other on the fourth side frame 204. The fourth antenna portion 304 may be disposed close to the first side frame 201 (specifically the second sub-frame 206). The sixth antenna portion 306 may be disposed close to the second side frame 202 (specifically the fourth sub-frame 208). The seventh antenna portion 307 may be disposed on the fourth sub-frame 208. The above seven antenna modules may be reasonably arranged or disposed on the frame 200, and cooperate with each other to form 2*2 MIMO (Multiple Input Multiple Output) configuration for a WIFI (Wireless Fidelity) frequency band and 4*4 MIMO configuration for a 5G NR (new ratio) frequency band below the Sub-6G frequency band. Thus, it is possible to achieve the antenna performance requirements for the Sub-6G frequency band.

Furthermore, the first antenna portion 301 may be operated in a GNSS (Global Navigation Satellite System) frequency band and the WIFI frequency band. The frequency bands of the antenna assembly corresponding to the first antenna portion 301 may cover at least 1550-1620 MHz, 2.4-2.5 GMHz, and 5.15-5.85 GMHz frequency bands. The second antenna portion 302 may be operated in the WIFI frequency band. The frequency bands of the antenna assembly corresponding to second antenna portion 302 may cover at least 2.4-2.5 GMHz and 5.15-5.85 GMHz frequency bands. The third antenna portion 303 may be operated in the 4G frequency band and the 5G NR frequency band. The frequency bands of the antenna assembly corresponding to the third antenna portion 303 may cover at least 790-960 MHz and 1710-2690 MHz, which may realize 2G, 3G, and 4G mobile communications. The frequency bands of the antenna assembly corresponding to the third antenna portion 303 may also cover the 5G NR frequency band below the Sub-6 GHz frequency band, such as an n41 frequency band (2460-2690 MHz), an n78 frequency band (3400-3600 MHz), an n79 frequency band (4800-5000 MHz), and the like. The fourth antenna portion 304 may be operated in the 5G NR frequency band. The frequency bands of the antenna assembly corresponding to the fourth antenna portion 304 may cover the 5G NR frequency band below the Sub-6 GHz frequency band, such as the n41 frequency band (2460-2690 MHz), the n78 frequency band (3400-3600 MHz), the n79 frequency band (4800-5000 MHz), and the like. The fifth antenna portion 305 may be operated in the 5G NR frequency band. The frequency bands of the antenna assembly corresponding to the fifth antenna portion 305 may cover the 5G NR frequency band below the Sub-6 GHz frequency band, such as the n78 frequency band (3400-3600 MHz) and the like. The sixth antenna portion 306 may be operated in the 5G NR frequency band. The frequency bands of the antenna assembly corresponding to the sixth antenna portion 306 may cover the 5G NR frequency band below the Sub-6 GHz frequency band, such as the n41 frequency band (2460-2690 MHz), the n78 frequency band (3400-3600 MHz), the n79 frequency band (4800-5000 MHz), and the like. The seventh antenna portion 307 may be operated in the 4G frequency band and the 5G NR frequency band. The frequency bands of the antenna assembly corresponding to the seventh antenna portion 307 may cover at least 790-960 MHz and 1710-2690 MHz, which may realize 2G, 3G, and 4G mobile communications. The frequency bands of the antenna assembly corresponding to the seventh antenna portion 307 may also cover 2460-2690 MHz and 4800-5000 MHz frequency bands.

In other words, the third antenna portion 303 and the seventh antenna portion 307 may be configured to realize the mobile communication under 2G, 3G, and 4G frequency bands. The first antenna portion 301 and the second antenna portion 302 may be configured to realize the 2*2MIMO configuration under the WIFI frequency band. The third antenna portion 303, the fourth antenna portion 304, the fifth antenna portion 305, the sixth antenna portion 306, and the seventh antenna portion 307 may be further configured to realize the 4*4 MIMO configuration under the Sub-6G frequency band. The first antenna portion 301 may be further configured to realize the GNSS navigation and positioning communication.

Furthermore, in some embodiments, a plurality of transmission portions may be arranged on the frame 200. Radio frequency signals may be emitted or transmitted out of the antenna assembly or transmitted into the antenna assembly via the transmission portions. More specifically, as shown in FIG. 3, the transmission portions may be disposed at two ends of each of the first antenna portion 301, the second antenna portion 302, the third antenna portion 303, the fourth antenna portion 304, the fifth antenna portion 305, the sixth antenna portion 306, and the seventh antenna portion 307. As shown in FIG. 3, the transmission portion 400 adjacent to the second antenna portion 302 and disposed on the third sub-frame 207 may be illustrated in FIG. 3.

In some embodiments, the plurality of transmission portions may be implemented as openings defined in the frame 200. The plurality of transmission portions may be defined in a non-metal side frame of the frame 200. In this way, it is possible to reduce the impact of the metal side frame on the radio frequency signals of the antenna modules.

Figure 4:
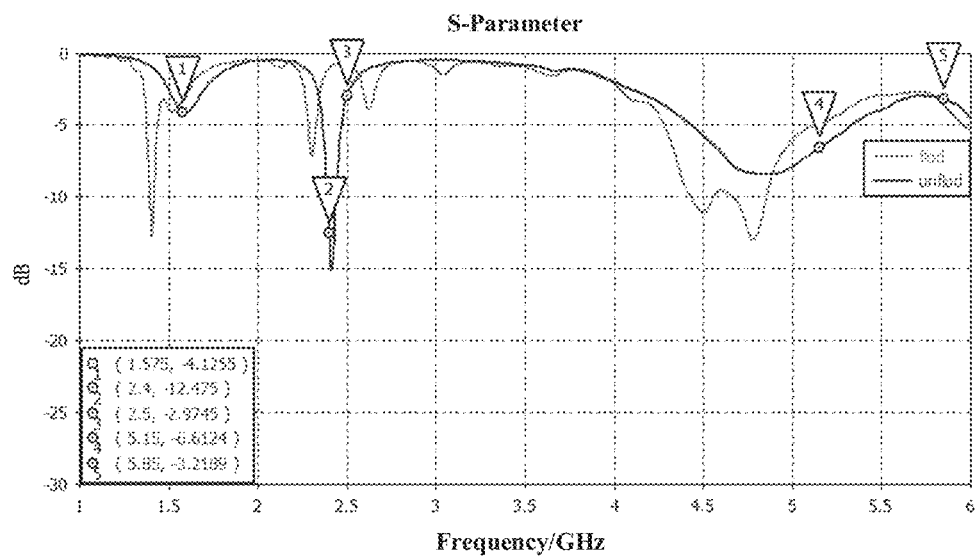
FIG. 4 is a curve graph illustrating a return loss of the antenna assembly corresponding to a first antenna portion according to some embodiments of the present disclosure.
Figure 5:
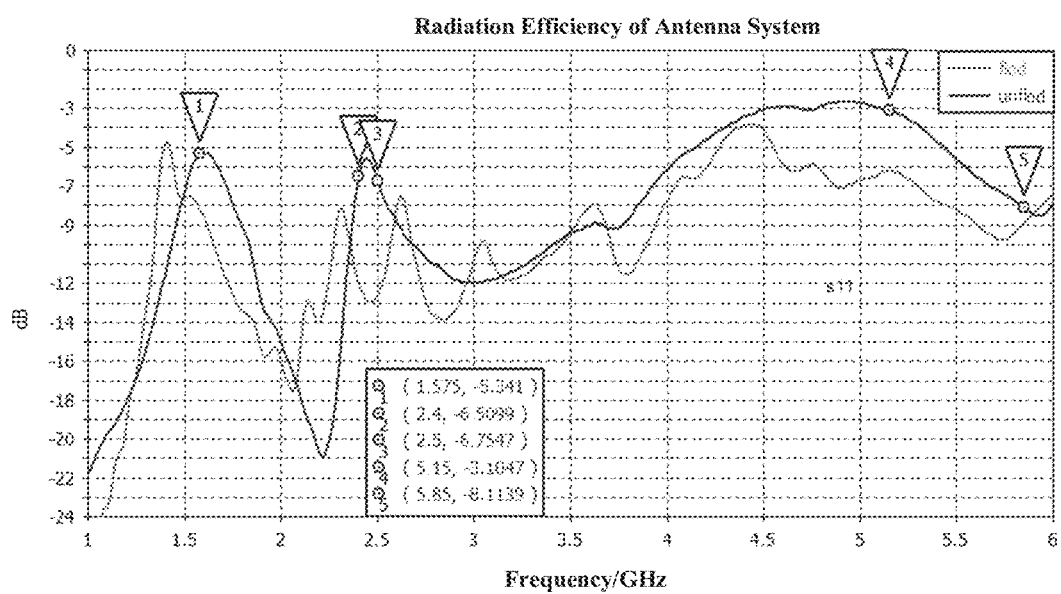
FIG. 5 is a curve graph illustrating an efficiency of the antenna assembly corresponding to the first antenna portion according to some embodiments of the present disclosure.

In some embodiments, FIG. 4 shows the return loss (S11 parameter) of the antenna assembly corresponding to the first antenna portion 301 during operation. More specifically, FIG. 4 shows the return losses of the antenna assembly corresponding to the first antenna portion 301 with the foldable screen in the unfolded state and the folded state, respectively. FIG. 5 shows the radiation efficiencies of the antenna assembly corresponding to the first antenna portion 301 during operation.

Figure 6:
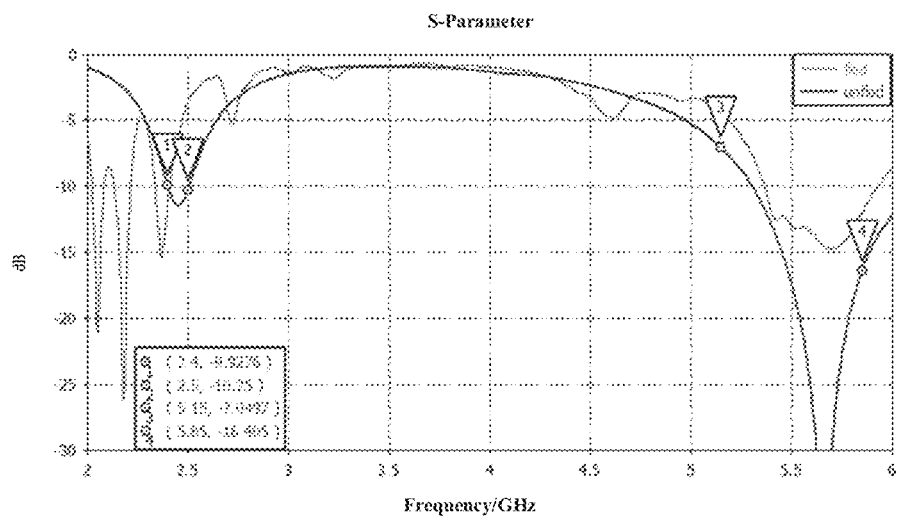
FIG. 6 is a curve graph illustrating a return loss of the antenna assembly corresponding to a second antenna portion according to some embodiments of the present disclosure.
Figure 7:
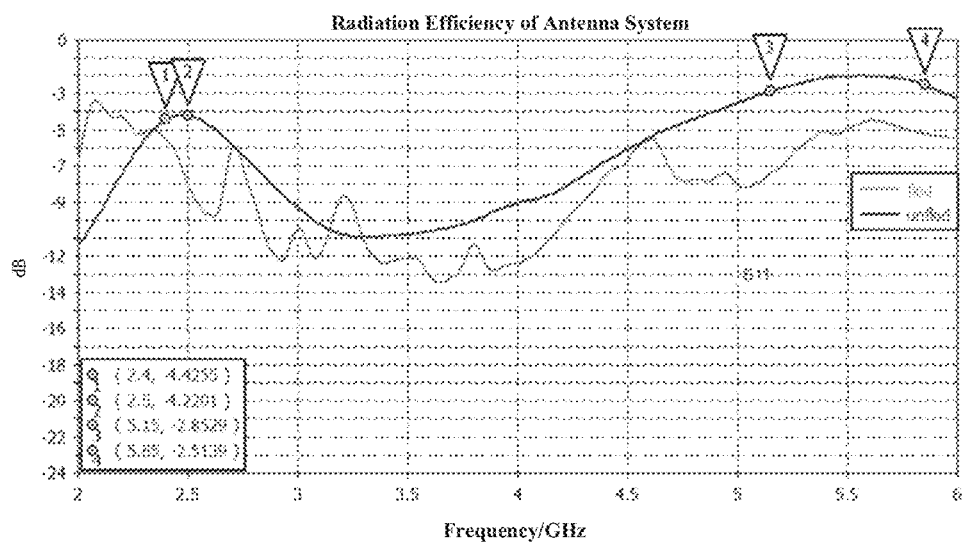
FIG. 7 is a curve graph illustrating an efficiency of the antenna assembly corresponding to the second antenna portion according to some embodiments of the present disclosure.

FIG. 6 illustrates the return losses (S11 parameter) of the antenna assembly corresponding to the second antenna portion 302 with the foldable screen in the unfolded state and the folded state, respectively. FIG. 7 illustrates the radiation efficiencies of the antenna assembly corresponding to the second antenna portion 302 with the foldable screen in the unfolded state and the folded state, respectively.

Figure 8:
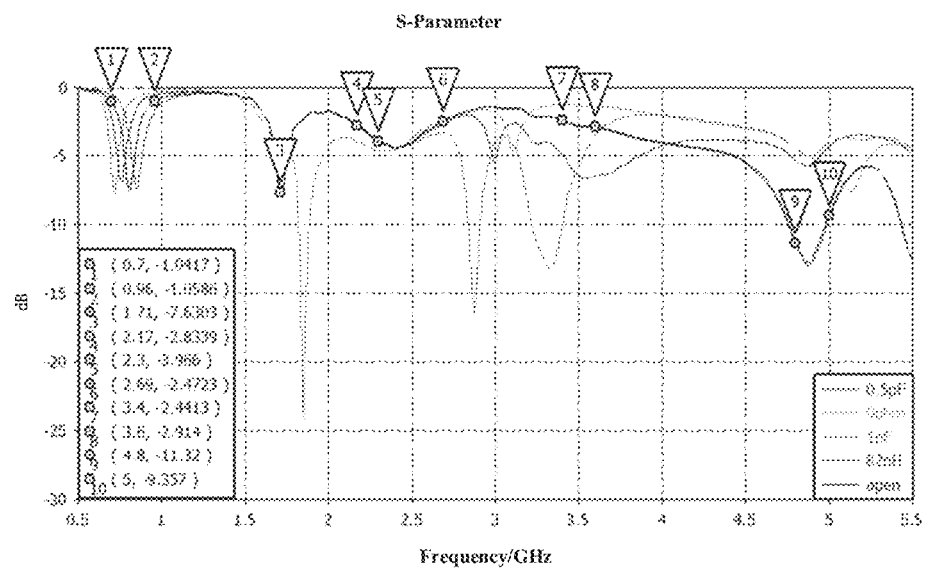
FIG. 8 is a curve graph illustrating a return loss of the antenna assembly corresponding to a third antenna portion with the foldable screen being in an unfolded state according to some embodiments of the present disclosure.
Figure 9:
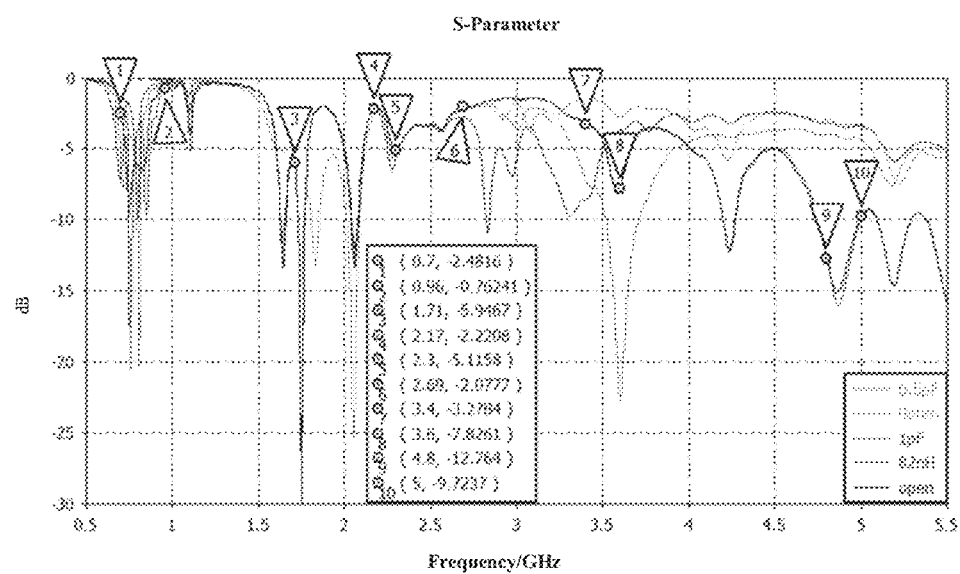
FIG. 9 is a curve graph illustrating a return loss of the antenna assembly corresponding to the third antenna portion with the foldable screen being in a folded state according to some embodiments of the present disclosure.
Figure 10:
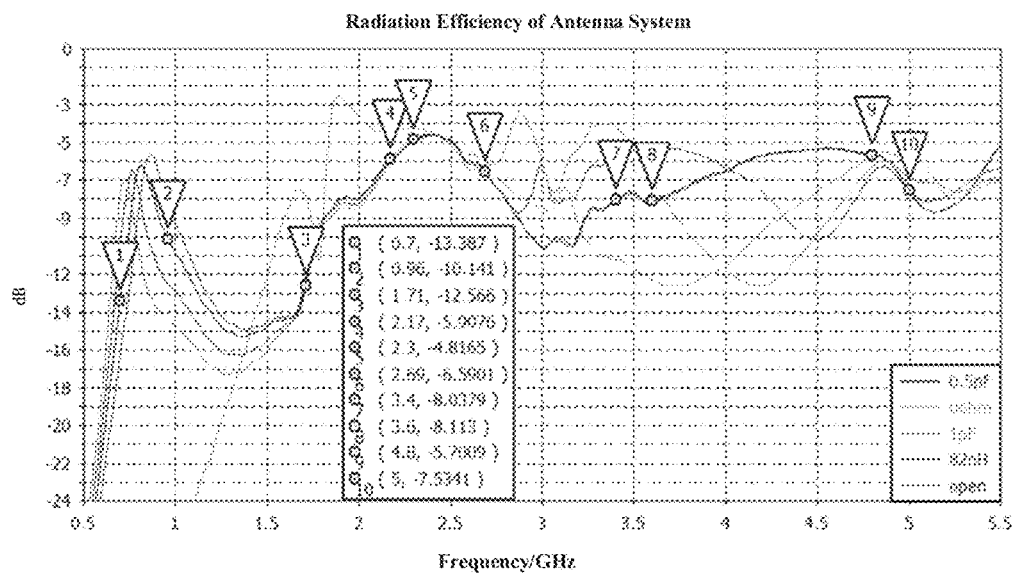
FIG. 10 is a curve graph illustrating an efficiency of the antenna assembly corresponding to the third antenna portion with the foldable screen being in the unfolded state according to some embodiments of the present disclosure.
Figure 11:
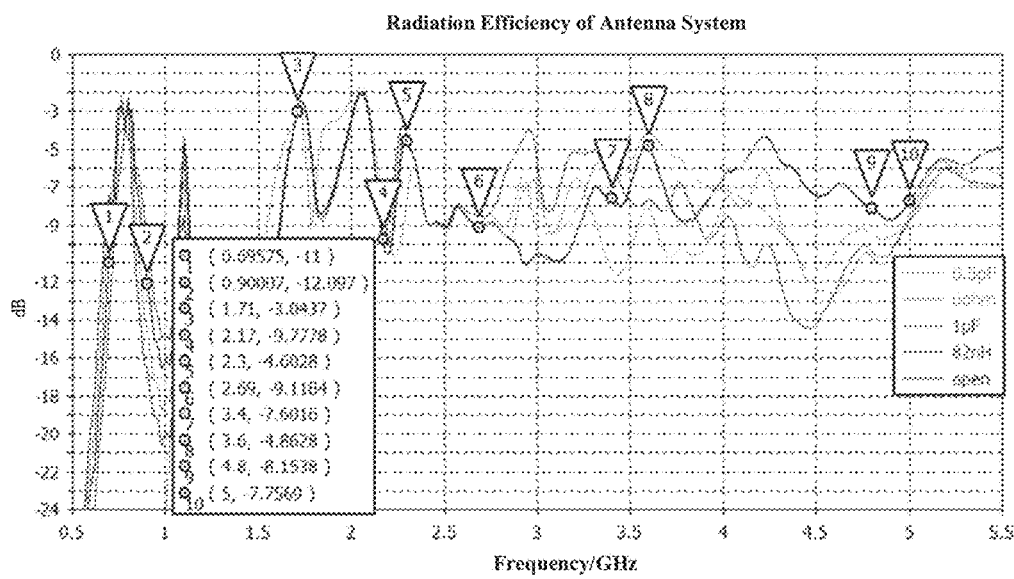
FIG. 11 is a curve graph illustrating an efficiency of the antenna assembly corresponding to the third antenna portion with the foldable screen being in the folded state according to some embodiments of the present disclosure.

FIG. 8 illustrates the return loss (S11 parameter) of the antenna assembly corresponding to the third antenna portion 303 with the foldable screen being in the unfolded state. FIG. 9 illustrates the return loss (S11 parameter) of the antenna assembly corresponding to the third antenna portion 303 with the foldable screen being in the folded state. FIG. 10 illustrates the radiation efficiency of the antenna assembly corresponding to the third antenna portion 303 with the foldable screen being in the unfolded state. FIG. 11 illustrates the radiation efficiency of the antenna assembly corresponding to the third antenna portion 303 with the foldable screen being in the folded state.

Figure 12:
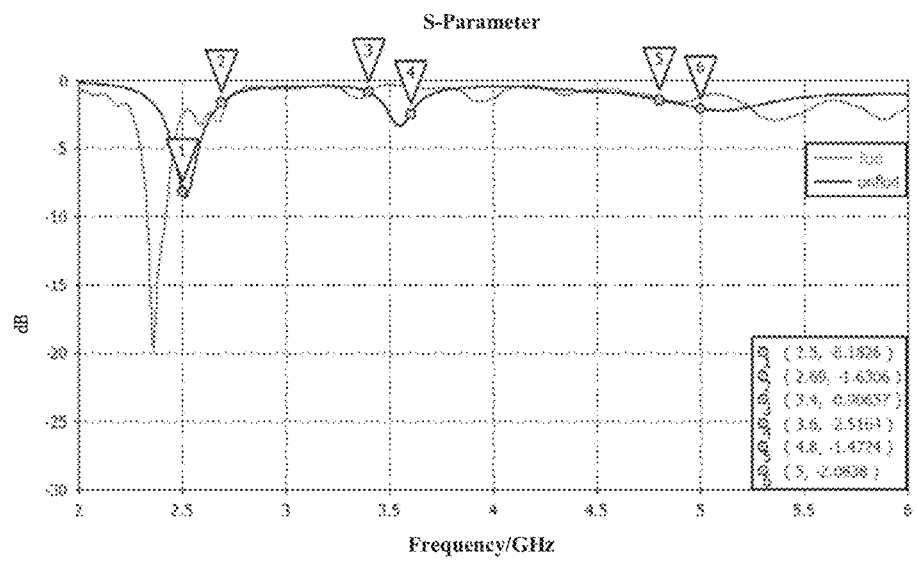
FIG. 12 is a curve graph illustrating a return loss of the antenna assembly corresponding to a fourth antenna portion according to some embodiments of the present disclosure.
Figure 13:
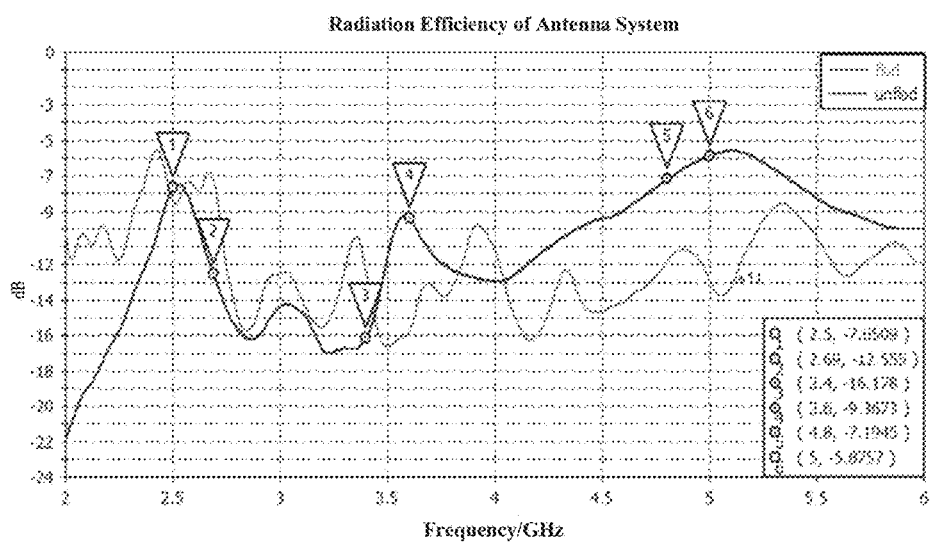
FIG. 13 is a curve graph illustrating an efficiency of the antenna assembly corresponding to the fourth antenna portion according to some embodiments of the present disclosure.

FIG. 12 illustrates the return losses (S11 parameter) of the antenna assembly corresponding to the fourth antenna portion 304 with the foldable screen in the unfolded state and the folded state, respectively. FIG. 13 illustrates the radiation efficiencies of the antenna assembly corresponding to the fourth antenna portion 304 with the foldable screen in the unfolded state and the folded state, respectively.

Figure 14:
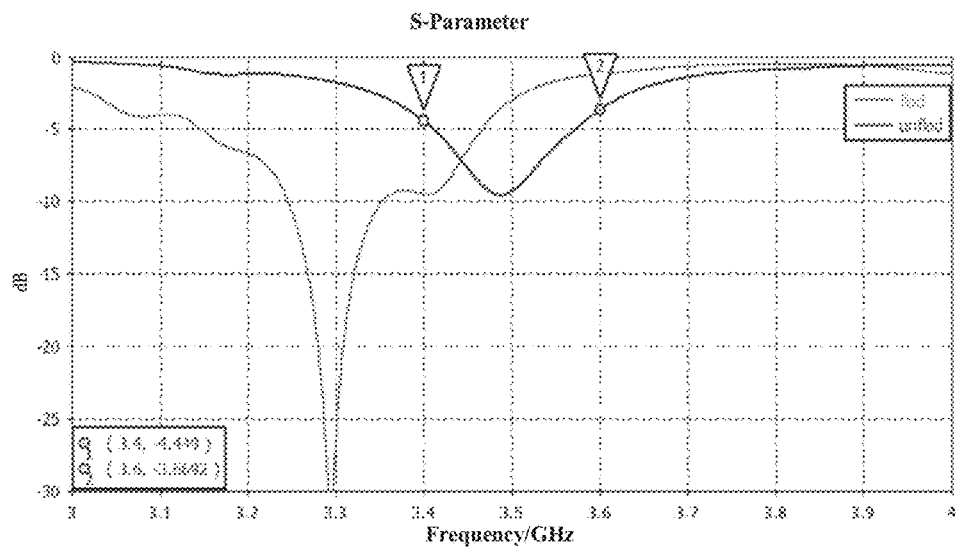
FIG. 14 is a curve graph illustrating a return loss of the antenna assembly corresponding to a fifth antenna portion according to some embodiments of the present disclosure.
Figure 15:
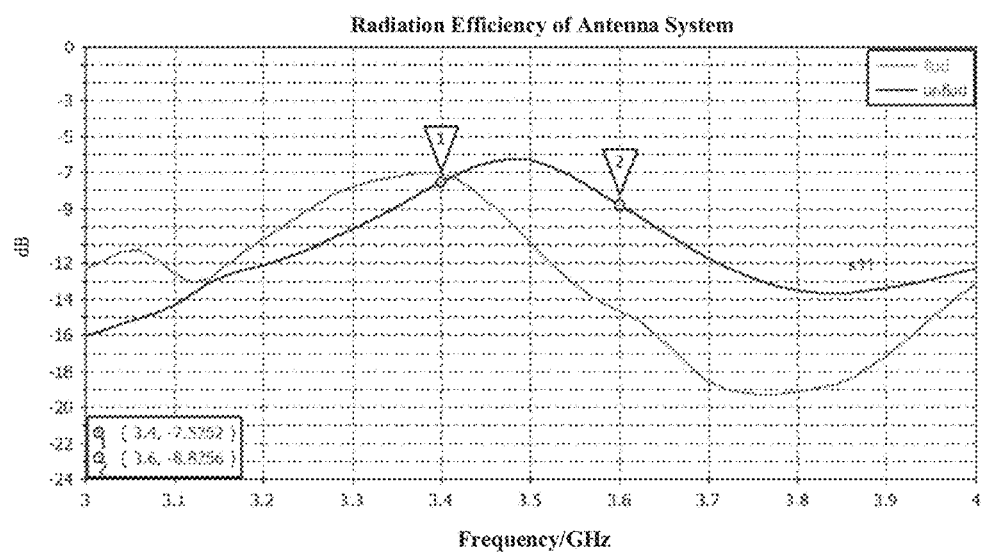
FIG. 15 is a curve graph illustrating an efficiency of the antenna assembly corresponding to the fifth antenna portion according to some embodiments of the present disclosure.
Figure 16:
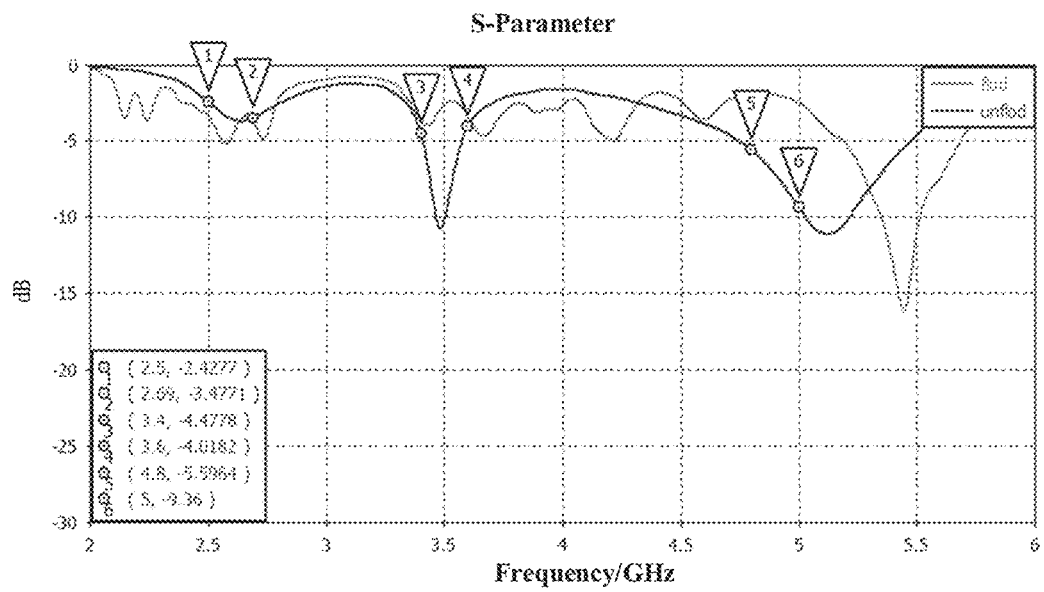
FIG. 16 is a curve graph illustrating a return loss of the antenna assembly corresponding to a sixth antenna portion according to some embodiments of the present disclosure.

FIG. 14 illustrates the return losses (S11 parameter) of the antenna assembly corresponding to the fifth antenna portion 305 with the foldable screen in the unfolded state and the folded state, respectively. FIG. 15 illustrates the radiation efficiencies of the antenna assembly corresponding to the fifth antenna portion 305 with the foldable screen in the unfolded state and the folded state, respectively.

Figure 17:
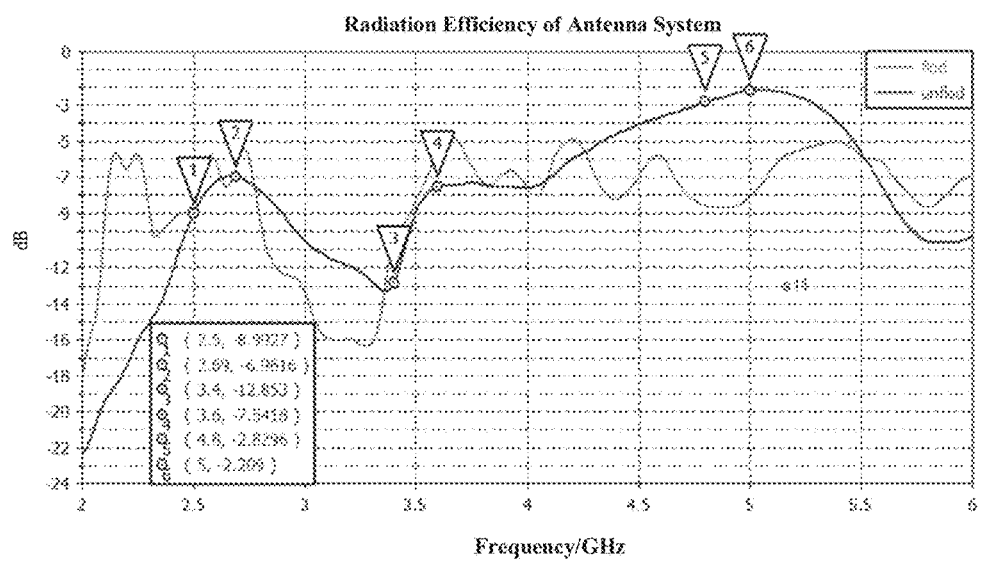
FIG. 17 is a curve graph illustrating an efficiency of the antenna assembly corresponding to the sixth antenna portion according to some embodiments of the present disclosure.

FIG. 17 illustrates the return losses (S11 parameter) of the antenna assembly corresponding to the sixth antenna portion 306 with the foldable screen in the unfolded state and the folded state, respectively. FIG. 15 illustrates the radiation efficiencies of the antenna assembly corresponding to the sixth antenna portion 306 with the foldable screen in the unfolded state and the folded state, respectively.

Figure 18:
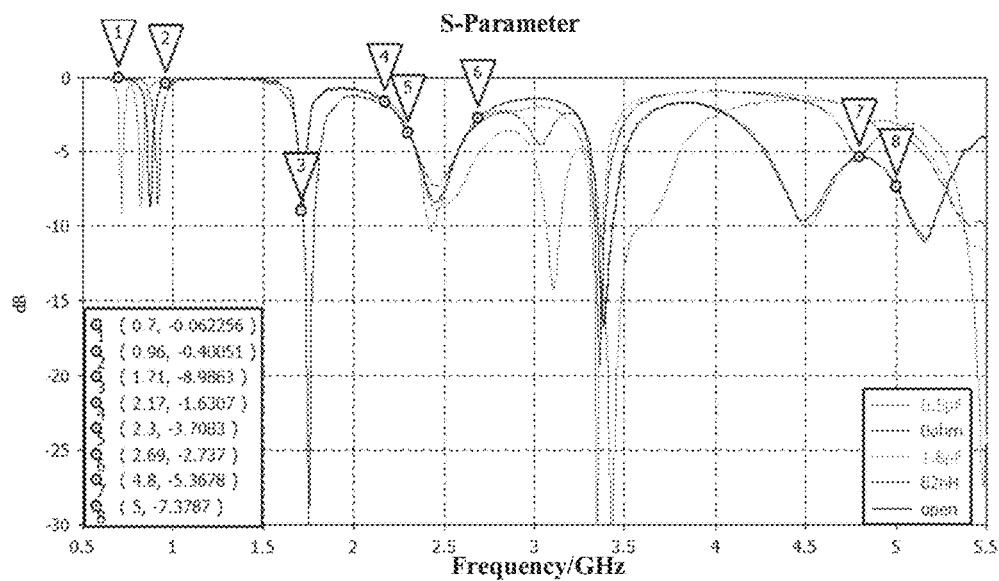
FIG. 18 is a curve graph illustrating a return loss of the antenna assembly corresponding to a seventh antenna portion with the foldable screen being in an unfolded state according to some embodiments of the present disclosure.
Figure 19:
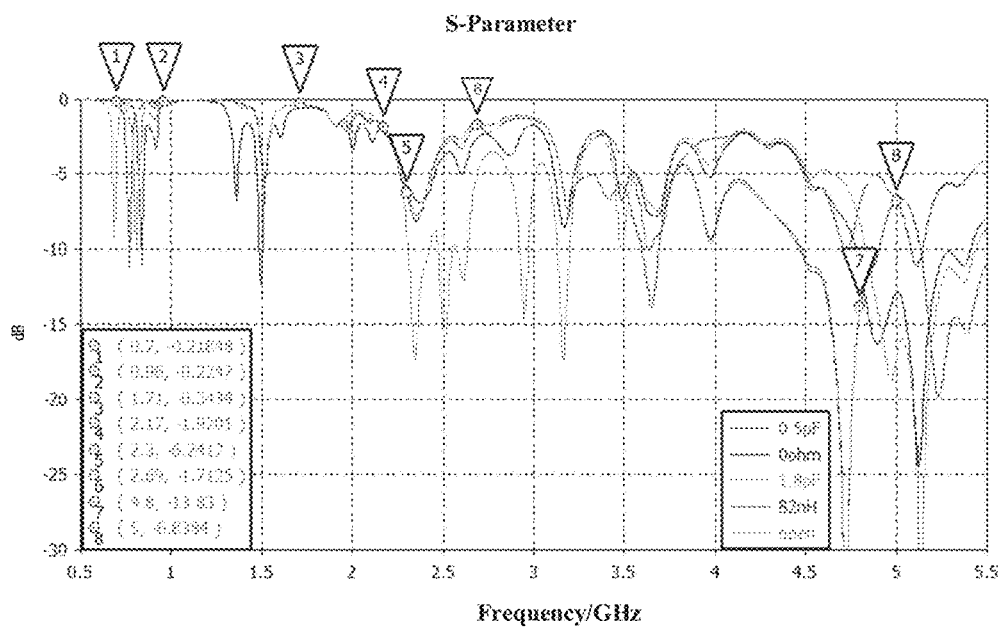
FIG. 19 is a curve graph illustrating a return loss of the antenna assembly corresponding to the seventh antenna portion with the foldable screen being in a folded state according to some embodiments of the present disclosure.
Figure 20:
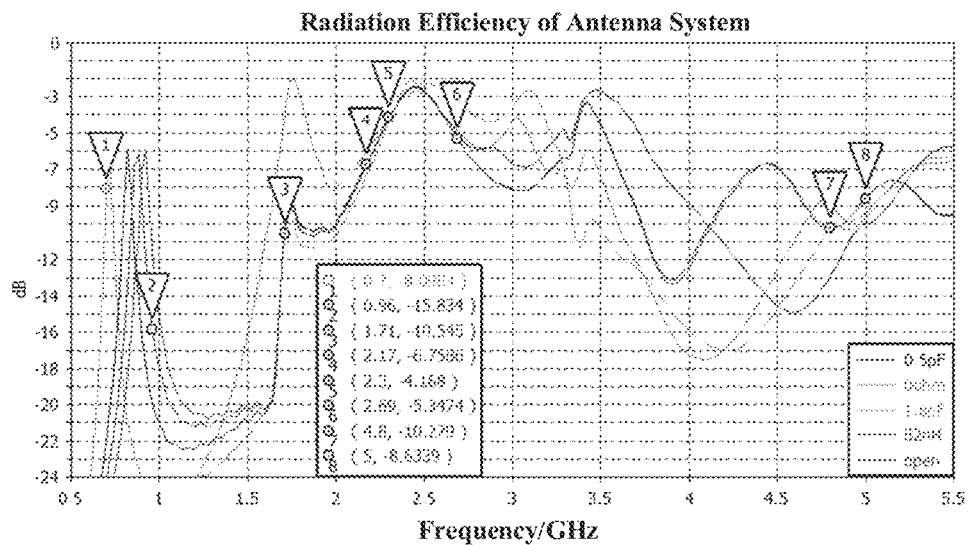
FIG. 20 is a curve graph illustrating an efficiency of the antenna assembly corresponding to the seventh antenna portion with the foldable screen being in the unfolded state according to some embodiments of the present disclosure.
Figure 21:
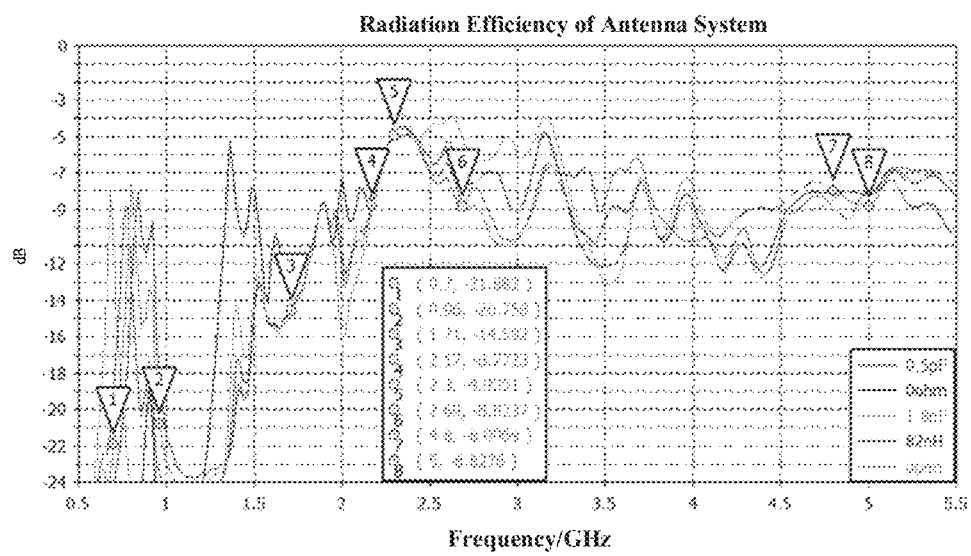
FIG. 21 is a curve graph illustrating an efficiency of the antenna assembly corresponding to the seventh antenna portion with the foldable screen being in the folded state according to some embodiments of the present disclosure.

FIG. 18 illustrates the return loss (S11 parameter) of the antenna assembly corresponding to the seventh antenna portion 307 with the foldable screen being in the unfolded state. FIG. 19 illustrates the return loss (S11 parameter) of the antenna assembly corresponding to the seventh antenna portion 307 with the foldable screen being in the folded state. FIG. 20 illustrates the radiation efficiency of the antenna assembly corresponding to the seventh antenna portion 307 with the foldable screen being in the unfolded state. FIG. 21 illustrates the radiation efficiency of the antenna assembly corresponding to the seventh antenna portion 307 with the foldable screen being in the folded state.

In addition, in some embodiments, a terminal may also be provided. The terminal may include a foldable screen, a housing, and the aforementioned antenna assembly 100 for a terminal with a foldable screen. The frame 200 may be disposed or arranged in the housing. By arranging the seven antenna modules as previously described on the frame 200 of the housing, the seven antenna modules may be reasonably arranged on the frame 200 of the terminal.

Furthermore, the foldable screen of the terminal may be divided into a first display screen and a second display screen. The first display screen may correspond to the first frame body 210, and the second display screen may correspond to the second frame body 220 shown in FIG. 2. The foldable screen and the antenna modules may be arranged in the housing. When the foldable screen is in the unfolded state, the first display screen and the second display screen form the display region of the terminal, that is to say, both the first display screen and the second display screen may display information. When the foldable screen is in the folded state, the second display screen is the display region of the terminal, that is to say, only the second display screen may display information.

In some embodiments of the present disclosure, the terminal may further include a USB (Universal Serial Bus) module 500 and a speaker 600. In some embodiments, the USB module 500 may be disposed adjacently to the third sub-frame 207, opposite to the third sub-frame 207, and spaced apart from the third sub-frame 207. The speaker 600 may also be disposed adjacently to the third sub-frame 207, oppositely to the third sub-frame 207, and spaced apart from the third sub-frame 207. The speaker 600 may be further spaced apart from the USB module 500. The speaker 600 may be disposed adjacently to, or even oppositely to the transmission portion 400 adjacent to the second antenna portion 302 on the third sub-frame 207. The speaker 600 may use the transmission portion 400 adjacent to the second antenna portion 302 on the third sub-frame 207 as a sound hole for transmitting sound signals. In this way, it is unnecessary to further define an additional opening for the speaker, and thus the number of the openings defined in the side frames may be reduced.

According to some embodiments of the present disclosure, in the antenna assembly for the terminal with the foldable screen and the terminal, seven antenna modules are respectively arranged at different positions of the frame of the terminal with the foldable screen, such that the seven antenna modules may cooperate with each other to form at least 2*2 MIMO configuration of the WIFI frequency band and 4*4 MIMO configuration of the 5G NR frequency band below the Sub-6G frequency band. More specifically, the frame may include a first side frame, a second side frame opposite to the first side frame, a third side frame, and a fourth side frame opposite to the third side frame. The first side frame may include a first sub-frame and a second sub-frame that are disposed symmetrically about the folding line of the frame. The second side frame may include a third sub-frame and a fourth sub-frame that are arranged symmetrically about the folding line of the frame. The first sub-frame may be disposed oppositely to the third sub-frame, and the second sub-frame may be disposed oppositely to the fourth sub-frame. The first sub-frame, the third side frame, and the third sub-frame, correspond to the first frame body of the frame. The second sub-frame, the fourth sub-frame, and the fourth side frame correspond to the second frame body of the frame. The first frame body may be rotatably connected to the second frame body, such that the first frame body and the second frame body may match with or be adapted to the folding and unfolding of the foldable screen by the rotation connection therebetween. The seven antenna modules may correspond to the first antenna portion, the second antenna portion, the third antenna portion, the fourth antenna portion, the fifth antenna portion, the sixth antenna portion, and the seventh antenna portion in a one-to-one correspondence. The first antenna portion may be disposed at a corner connecting the first side frame to the third side frame. The second antenna portion may be disposed at a corner connecting the second side frame and the third side frame. The third antenna portion may be disposed on the second sub-frame. The fourth antenna portion, the fifth antenna portion, and the sixth antenna portion may be sequentially arranged on the fourth side frame. The fourth antenna portion may be disposed close to the first side frame. The sixth antenna portion may be disposed close to the second side frame. The seventh antenna portion may be disposed on the fourth sub-frame. That is to say, in some embodiments of the present disclosure, the seven antenna modules may be arranged on the frame of the terminal with the foldable screen, respectively. In this way, the antenna assembly may be applied to the terminal with the foldable screen. Besides, the antenna assembly may be compatible in the WIFI frequency band, the 4G frequency band, and the Sub-6 GHz frequency band. Thus, the communication performance of the terminal equipped with the foldable screen may be better.

The above are only some embodiments of the present disclosure. It should be pointed out here that for those skilled in the art, improvements may be made without departing from the inventive concept of the present disclosure. All these belong to the protection scope of the present disclosure.

What is claimed is:

1. An antenna assembly for a terminal with a foldable screen, comprising a foldable frame and seven antenna modules arranged on the frame;
    wherein the frame comprises a first frame body and a second frame body rotatably connected to the first frame body, such that the first frame body is foldable to the second frame body; when the first frame body is folded to the second frame body, the first frame body is overlapped with the second frame body;
    the frame comprises:
        a first side frame, wherein the first side frame comprises a first sub-frame and a second sub-frame that are disposed symmetrically about a folding line of the frame;
        a second side frame, opposite to the first side frame, wherein the second side frame comprises a third sub-frame and a fourth sub-frame that are arranged symmetrically about the folding line of the frame; the first sub-frame is disposed oppositely to the third sub-frame, and the second sub-frame is disposed oppositely to the fourth sub-frame;
        a third side frame, connected between the first side frame and the second side frame; and
        a fourth side frame, opposite to the third side frame and connected between the first side frame and the second side frame;
    wherein the first frame body comprises the first sub-frame, the third side frame, and the third sub-frame, and the second frame body comprises the second sub-frame, the fourth sub-frame, and the fourth side frame;
    a first antenna portion, a second antenna portion, a third antenna portion, a fourth antenna portion, a fifth antenna portion, a sixth antenna portion, and a seventh antenna portion are disposed on the frame, and the seven antenna modules correspond to the first antenna portion, the second antenna portion, the third antenna portion, the fourth antenna portion, the fifth antenna portion, the sixth antenna portion, and the seventh antenna portion in a one-to-one correspondence; the first antenna portion is disposed at a corner connecting the first side frame to the third side frame; the second antenna portion is disposed at a corner connecting the second side frame and the third side frame; the third antenna portion is disposed on the second sub-frame; the fourth antenna portion, the fifth antenna portion, and the sixth antenna portion are sequentially arranged on the fourth side frame and spaced apart from each other; the fourth antenna portion is disposed close to the first side frame; the sixth antenna portion is disposed close to the second side frame, and the seventh antenna portion is disposed on the fourth sub-frame;

the seven antenna modules cooperate with each other to form at least 2*2 MIMO (Multiple Input Multiple Output) configuration of a WIFI (Wireless Fidelity) frequency band and 4*4 MIMO configuration of a 5G NR (new ratio) frequency band below a Sub-6G frequency band.

2. The antenna assembly as claimed in claim 1, wherein a plurality of transmission portions are arranged on the frame, and radio frequency signals are capable of being transmitted through the plurality of transmission portions.

3. The antenna assembly as claimed in claim 2, wherein the plurality of transmission portions comprises the transmission portions disposed at two opposite ends of each of the first antenna portion, the second antenna portion, the third antenna portion, the fourth antenna portion, the fifth antenna portion, the sixth antenna portion, and the seventh antenna portion.

4. The antenna assembly as claimed in claim 3, wherein the plurality of transmission portions are openings defined in at least one non-metal side frame of the frame.

5. The antenna assembly as claimed in claim 1, wherein a size of the first side frame in a first direction is substantially 1.35 mm, a size of the second side frame in the first direction is substantially 1 mm, a size of the third side frame in a second direction is substantially 0.5 mm, and a size of the fourth side frame in a second direction is substantially 0.5 mm;

wherein the first direction is a direction directed from the first side frame to the second side frame, and the second direction is a direction directed from the third side frame to the fourth side frame; the first direction is substantially vertical to the second direction.

6. The antenna assembly as claimed in claim 1, wherein the first antenna portion is operated in a GNSS (Global Navigation Satellite System) frequency band and the WIFI frequency band;

the second antenna portion is operated in the WIFI frequency band;

the third antenna portion is operated in a 4G frequency band and the 5G NR frequency band;

the fourth antenna portion is operated in the 5G NR frequency band;

the fifth antenna portion is operated in the 5G NR frequency band;

the sixth antenna portion is operated in the 5G NR frequency band; and the seventh antenna portion is operated in the 4G frequency band and 5G NR frequency band.

7. The antenna assembly as claimed in claim 6, wherein frequency bands of the antenna module corresponding to the first antenna portion are 1550-1620 MHz, 2.4-2.5 GMHz, and 5.15-5.85 GMHz;

frequency bands of the antenna assembly corresponding to the second antenna portion are 2.4-2.5 GMHz and 5.15-5.85 GMHz;

frequency bands of the antenna assembly corresponding to the third antenna portion are 790-960 MHz, 1710-2690 MHz, 2496-2690 MHz, 3400-3600 MHz, and 4800-5000 MHz;

frequency bands of the antenna assembly corresponding to the fourth antenna portion are 2496-2690 MHz, 3400-3600 MHz, and 4800-5000 MHz;

a frequency band of the antenna assembly corresponding to the fifth antenna portion is 3400-3600 MHz;

frequency bands of the antenna assembly corresponding to the sixth antenna portion are 2496-2690 MHz, 3400-3600 MHz, and 4800-5000 MHz;

frequency bands of the antenna assembly corresponding to the seventh antenna portion are 790-960 MHz, 1710-2690 MHz, and 4800-5000 MHz.

8. The antenna assembly as claimed in claim 7, wherein the third antenna portion and the seventh antenna portion are configured to realize mobile communications under 2G, 3G, and 4G frequency bands; the first antenna portion and the second antenna portion are configured to realize the 2*2MIMO configuration under the WIFI frequency band; the third antenna portion, the fourth antenna portion, the fifth antenna portion, the sixth antenna portion, and the seventh antenna portion are further configured to realize the 4*4 MIMO configuration under the Sub-6G frequency band, and the first antenna portion is configured to realize a GNSS navigation and positioning communication.

9. The antenna assembly as claimed in claim 1, wherein the first side frame, the third side frame, the second side frame, and the fourth side frame are connected end-to-end. And the frame is substantially in shape of a square.

10. A terminal, comprising:
an antenna assembly, comprising a foldable frame and seven antenna modules arranged on the frame;
wherein the frame comprises a first frame body and a second frame body rotatably connected to the first frame body, such that the first frame body is foldable to the second frame body; when the first frame body is folded to the second frame body, the first frame body is overlapped with the second frame body;
the frame comprises:
a first side frame, wherein the first side frame comprises a first sub-frame and a second sub-frame that are disposed symmetrically about a folding line of the frame;
a second side frame, opposite to the first side frame, wherein the second side frame comprises a third sub-frame and a fourth sub-frame that are arranged symmetrically about the folding line of the frame; the first sub-frame is disposed oppositely to the third sub-frame, and the second sub-frame is disposed oppositely to the fourth sub-frame;
a third side frame, connected between the first side frame and the second side frame; and
a fourth side frame, opposite to the third side frame and connected between the first side frame and the second side frame;
wherein the first frame body comprises the first sub-frame, the third side frame, and the third sub-frame, and the second frame body comprises the second sub-frame, the fourth sub-frame, and the fourth side frame;
a first antenna portion, a second antenna portion, a third antenna portion, a fourth antenna portion, a fifth antenna portion, a sixth antenna portion, and a seventh antenna portion are disposed on the frame, and the seven antenna modules correspond to the first antenna portion, the second antenna portion, the third antenna portion, the fourth antenna portion, the fifth antenna portion, the sixth antenna portion, and the seventh antenna portion in a one-to-one correspondence; the first antenna portion is disposed at a corner connecting the first side frame to the third side frame; the second antenna portion is disposed at a corner connecting the second side frame and the third side frame; the third antenna portion is disposed on the second sub-frame; the fourth antenna portion, the fifth antenna portion, and the sixth antenna portion are sequentially arranged on the fourth side frame and spaced apart from each other; the fourth antenna portion is disposed close to the first side frame; the sixth antenna portion is disposed close to the second side frame, and the seventh antenna portion is disposed on the fourth sub-frame;

the seven antenna modules cooperate with each other to form at least 2*2 MIMO (Multiple Input Multiple Output) configuration of a WIFI (Wireless Fidelity) frequency band and 4*4 MIMO configuration of a 5G NR (new ratio) frequency band below a Sub-6G frequency band; and a foldable screen, switchable between an unfolded state and a folded state and comprising a first display screen and a second display screen, wherein the first display screen is disposed on the first frame body, and the second display screen is disposed on the second frame body; when the foldable screen is in the unfolded state, the first display screen and the second display screen cooperatively form a display region of the terminal; when the foldable screen is in the folded state, the second display screen forms the display region of the terminal.

11. The antenna assembly as claimed in claim 10, wherein a plurality of transmission portions are arranged on the frame, and radio frequency signals are capable of being transmitted through the plurality of transmission portions.

12. The antenna assembly as claimed in claim 11, wherein the plurality of transmission portions comprises the transmission portions disposed at two opposite ends of each of the first antenna portion, the second antenna portion, the third antenna portion, the fourth antenna portion, the fifth antenna portion, the sixth antenna portion, and the seventh antenna portion.

13. The antenna assembly as claimed in claim 12, wherein the plurality of transmission portions are openings defined in at least one non-metal side frame of the frame.

14. The antenna assembly as claimed in claim 10, wherein a size of the first side frame in a first direction is substantially 1.35 mm, a size of the second side frame in the first direction is substantially 1 mm, a size of the third side frame in a second direction is substantially 0.5 mm, and a size of the fourth side frame in a second direction is substantially 0.5 mm;

wherein the first direction is a direction directed from the first side frame to the second side frame, and the second direction is a direction directed from the third side frame to the fourth side frame; the first direction is substantially vertical to the second direction.

15. The antenna assembly as claimed in claim 10, wherein the first antenna portion is operated in a GNSS (Global Navigation Satellite System) frequency band and the WIFI frequency band;

the second antenna portion is operated in the WIFI frequency band;

the third antenna portion is operated in a 4G frequency band and the 5G NR frequency band;

the fourth antenna portion is operated in the 5G NR frequency band;

the fifth antenna portion is operated in the 5G NR frequency band;

the sixth antenna portion is operated in the 5G NR frequency band; and the seventh antenna portion is operated in the 4G frequency band and 5G NR frequency band.

16. The antenna assembly as claimed in claim 15, wherein frequency bands of the antenna module corresponding to the first antenna portion are 1550-1620 MHz, 2.4-2.5 GMHz, and 5.15-5.85 GMHz;

frequency bands of the antenna assembly corresponding to the second antenna portion are 2.4-2.5 GMHz and 5.15-5.85 GMHz;

frequency bands of the antenna assembly corresponding to the third antenna portion are 790-960 MHz, 1710-2690 MHz, 2496-2690 MHz, 3400-3600 MHz, and 4800-5000 MHz;

frequency bands of the antenna assembly corresponding to the fourth antenna portion are 2496-2690 MHz, 3400-3600 MHz, and 4800-5000 MHz;

a frequency band of the antenna assembly corresponding to the fifth antenna portion is 3400-3600 MHz;

frequency bands of the antenna assembly corresponding to the sixth antenna portion are 2496-2690 MHz, 3400-3600 MHz, and 4800-5000 MHz;

frequency bands of the antenna assembly corresponding to the seventh antenna portion are 790-960 MHz, 1710-2690 MHz, and 4800-5000 MHz.

17. The antenna assembly as claimed in claim 16, wherein the third antenna portion and the seventh antenna portion are configured to realize mobile communications under 2G, 3G, and 4G frequency bands; the first antenna portion and the second antenna portion are configured to realize the 2*2MIMO configuration under the WIFI frequency band; the third antenna portion, the fourth antenna portion, the fifth antenna portion, the sixth antenna portion, and the seventh antenna portion are further configured to realize the 4*4 MIMO configuration under the Sub-6G frequency band, and the first antenna portion is configured to realize a GNSS navigation and positioning communication.

18. The terminal as claimed in claim 10, wherein the terminal further comprises a USB (Universal Serial Bus) module, and the USB module is arranged adjacently to the third sub-frame.

19. The terminal as claimed in claim 10, wherein the terminal further comprises a speaker, and the speaker is arranged adjacently to the third sub-frame and further opposite to the transmission portion which is arranged on the third sub-frame and which is adjacent to the second antenna portion.

20. The terminal as claimed in claim 19, wherein the speaker is configured to transmit sound signals via the transmission portion which is arranged on the third sub-frame and which is adjacent to the second antenna portion.

* * * * *